United States Patent
Kim et al.

(10) Patent No.: US 7,912,018 B2
(45) Date of Patent: Mar. 22, 2011

(54) APPARATUS AND METHOD FOR CONTROLLING TRANSMISSION RATE IN A WIRELESS LAN

(75) Inventors: Young-Soo Kim, Seoul (KR); Kyung-Hun Jang, Suwon-si (KR); Hyo-Sun Hwang, Seoul (KR); Sunghyun Choi, Seoul (KR); Jongseok Kim, Seoul (KR); Seongkwan Kim, Seoul (KR)

(73) Assignees: Samsung Electronics Co., Ltd (KR); Seoul National University Industry Foundation (KR)

(*) Notice: Subject to any disclaimer, the term of this patent is extended or adjusted under 35 U.S.C. 154(b) by 869 days.

(21) Appl. No.: 11/636,798

(22) Filed: Dec. 11, 2006

(65) Prior Publication Data

US 2007/0133459 A1    Jun. 14, 2007

(30) Foreign Application Priority Data

Dec. 9, 2005    (KR) .................. 10-2005-0120351

(51) Int. Cl.
*H04W 4/00* (2009.01)
*H04B 7/212* (2006.01)
*H04J 3/16* (2006.01)

(52) U.S. Cl. ........ 370/338; 370/348; 370/333; 370/465; 370/346

(58) Field of Classification Search ............. 370/338, 370/395.2, 348, 465, 328, 445, 232, 333, 370/235

See application file for complete search history.

(56) References Cited

U.S. PATENT DOCUMENTS

| 0,213,554 | A1 | 9/2005 | Ginzburg et al. | |
|---|---|---|---|---|
| 2005/0041616 | A1* | 2/2005 | Ginzburg et al. | 370/328 |
| 2005/0053037 | A1* | 3/2005 | Ginzburg et al. | 370/333 |
| 2005/0141476 | A1* | 6/2005 | Choi et al. | 370/348 |
| 2006/0198305 | A1* | 9/2006 | Hamdi | 370/232 |
| 2007/0115907 | A1* | 5/2007 | Myles et al. | 370/338 |

FOREIGN PATENT DOCUMENTS

| JP | 2002-217913 | 8/2002 |
|---|---|---|
| KR | 102003008339 | 10/2003 |

OTHER PUBLICATIONS

Ad Kamerman et al.; "WaveLAN-II: A High-Performance Wireless LAN for the Unlicenced Bands"; Bell Labs Technical Journal; vol. 2; No. 3; Aug. 1997; pp. 118-133.
Namgi Kim, "Effective Packet Transmission Scheme in Multirate WLAN", IEEE 802.11, vol. 31, No. 2A, 2006.

* cited by examiner

*Primary Examiner* — Huy Phan
*Assistant Examiner* — Kuo Woo
(74) *Attorney, Agent, or Firm* — The Farrell Law Firm, P.C.

(57) ABSTRACT

An apparatus and method for controlling transmission rate by determining whether a data transmission failure is caused by a channel error or a data collision in order to reduce a collision-caused rate decrease or a collision-caused rate increase delay in a WLAN. A collision-caused data transmission failure and if the number of data transmission failures reaches a predetermined threshold, data is retransmitted by means of an RTS/CTS exchange.

23 Claims, 5 Drawing Sheets

APPARATUS AND METHOD FOR CONTROLLING TRANSMISSION RATE IN A WIRELESS LAN

PRIORITY

This application claims priority under 35 U.S.C. §119 to a Korean application filed in the Korean Intellectual Property Office on Dec. 9, 2005 and assigned Serial No. 2005-120351, the contents of which are incorporated herein by reference.

BACKGROUND OF THE INVENTION

1. Field of the Invention

The present invention relates to an apparatus and method for controlling data transmission rate, taking into account collision in a Wireless Local Area Network (WLAN), in which a collision-caused rate decrease is reduced by detecting collision-caused data transmission failures, and if a predetermined number of or more data transmission failures occur, data is retransmitted by a Request-To-Send/Clear-To-Send (RTS/CTS) exchange.

2. Description of the Related Art

An Institute of Electrical and Electronics Engineers (IEEE) 802.11 WLAN adopts a link adaptation strategy to enhance throughput for a Station (STA). The link adaptation strategy selects the highest available transmission rate at a given time among the multiple transmission rates provided by IEEE 802.11 adaptively according to the current link condition.

While the IEEE 802.11 WLAN standards specify the multiple available transmission rates, how to use them, i.e. the link adaptation strategy is yet to be specified. In this context, many link adaptation schemes have been proposed in these or many other forms. Automatic Rate Fallback (ARF) is the first link adaptation algorithm proposed for use in the IEEE 802.11 WLAN and most widely implemented for STAs and Access Points (APs) at present.

In ARF, in order to estimate the highest available data rate under the current radio environment, the transmission rate is decreased by one level if transmission failure occurs twice successively, and raised by one level if the number of consecutive successful transmissions reaches 10. For details of ARF, see *WaveLAN-II: A High Performance Wireless LAN for the Unlicensed Band*, by Ad Kamerman and Leo Monteban, Bell Labs Technical Journal, vol. 2, no. 3, pp. 118-133, August 1997.

A drawback with most of the so-far proposed link adaptation schemes including ARF is that performance decreases drastically in an environment suffering from high radio resource contention. When many STAs associate with an AP or under severe contention, the probability of collision with frames from another STA or from another AP increases. However, since the Medium Access Control (MAC) layer of the IEEE 802.11 WLAN assumes a transmission failure solely after a timeout period, it does not distinguish a collision-caused transmission failure from a channel error-caused transmission failure. Therefore, in a link adaptation scheme such as ARF, when a collision occurs, the collision is mistaken as channel errors and the transmission rate is one level decreased. This malfunction is more frequent as contention becomes more severe. Even under a radio environment allowing data transmission at higher data rates, the rates of STAs and APs attempting to send at lower rates increase.

When channel errors are generated due to conditions such as path loss, fading or frames colliding with each other, a sending STA fails to receive an Acknowledgement (Ack) frame for a transmitted data frame. Time consumption involved in failed transmission increases with a larger data frame size and a lower transmission rate. Especially in the presence of a hidden STA or when more STAs contend for a radio channel, the problem becomes worse, adversely affecting the entire WLAN.

The RTS/CTS exchange implemented and used basically in the IEEE 802.11 WLAN family of technologies is a strategy for controlling collision using short control frames without payload, RTS and CTS frames.

Before data frame transmission, an RTS frame is sent to a receiving STA. After a Short InterFrame Space (SIFS) defined by the IEEE 802.11 WLAN standards, the receiving STA replies with a CTS frame. Also after the SIFS, a sending STA sends an actual data frame. The RTS and CTS frames contain information indicating the transmission times of the actual data frame and an Ack frame for the data frame, all other STAs hearing the RTS/CTS packet defer channel access during the RTS-CTS-data-Ack frame transmission. As a consequence, the sending STA reserves the channel for the duration of data frame transmission by the RTS/CTS exchange. Hence, the hidden STA problem is solved. Even when the RTS frame is lost due to collision, the loss is relatively small because the RTS frame is relatively short. Therefore, the RTS/CTS exchange mechanism is highly effective in an environment where many STAs contend for the channel.

However, the RTS/CTS exchange mechanism adds to overhead with transmission of RTS/CTS frames. Since the RTS/CTS exchange overhead increases with less STAs participating in contention, this scheme is not used much in a real WLAN environment.

Accordingly, there exists a need for an apparatus and method for sending data at an optimum transmission rate both in a high-contention environment and a low-contention environment of a WLAN.

SUMMARY OF THE INVENTION

An object of the present invention is to substantially solve at least the above problems and/or disadvantages and to provide at least the advantages below. Accordingly, an object of the present invention is to provide an apparatus and method for controlling transmission rate, taking into account collision in a WLAN.

Another object of the present invention is to provide an apparatus and method for retransmitting data by an RTS/CTS exchange when data transmission fails a predetermined number of or more times in a WLAN.

A further object of the present invention is to provide an apparatus and method for reducing a collision-caused rate decrease by detecting collision-caused transmission failures in a WLAN.

The above objects are achieved by providing an apparatus and method for controlling transmission rate, taking into account collision in a WLAN.

According to one aspect of the present invention, in a WLAN apparatus for controlling transmission rate, taking into account collision, a WLAN transceiver sends and receives data and RTS and CTS frames under the control of a controller. An RTS/CTS generator generates the RTS and CTS frames under the control of the controller. When a data transmission fails, the controller sets a success number to an initial value, increases a failure number, determines whether an RTS/CTS exchange triggering condition is fulfilled, performs an RTS/CTS exchange scheme if the RTS/CTS exchange triggering condition is fulfilled, compares the failure number with a failure threshold, decreases a transmission rate of the WLAN apparatus by one level, if the failure number is greater than or equal to the failure threshold, and retransmits data at the decreased transmission rate.

According to another aspect of the present invention, in a WLAN apparatus for controlling transmission rate, taking into account collision, a WLAN transceiver sends and receives data and RTS and CTS frames under the control of a controller. An RTS/CTS generator generates the RTS and CTS frames under the control of the controller. A collision detector detects whether a collision has occurred to data when a data transmission has failed. When the data transmission fails, the controller sets a success number to an initial value, determines whether an RTS/CTS exchange scheme has been performed before, performs the collision detection through the collision detector if the RTS/CTS exchange scheme has not performed before, increases a failure number if collisions are not detected, determines whether an RTS/CTS exchange triggering condition is fulfilled, performs an RTS/CTS exchange scheme if the RTS/CTS exchange triggering condition is fulfilled, compares the failure number with a failure threshold, decreases a transmission rate of the WLAN apparatus by one level, if the failure number is greater than or equal to the failure threshold, and retransmits data at the decreased transmission rate.

According to a further aspect of the present invention, in a method of controlling transmission rate, taking into account collision in a WLAN apparatus, it is determined whether a data transmission is successful or has failed. If the data transmission has failed, a success number is set to an initial value, a failure number is increased, and it is determined whether an RTS/CTS exchange triggering condition is fulfilled. If the RTS/CTS exchange triggering condition is fulfilled, an RTS frame is sent to a receiving WLAN apparatus to which data was transmitted. Reception of a CTS frame is monitored and the RTS frame is retransmitted until receiving the CTS frame. The failure number is compared with a failure threshold. If the failure number is greater than or equal to the failure threshold, a transmission rate of the WLAN apparatus is decreased by one level and data is retransmitted at the decreased transmission rate.

According to still another aspect of the present invention, in a method of controlling transmission rate, taking into account collision in a WLAN apparatus, it is determined whether transmission of data is successful or has failed. If the data transmission has failed, a success number is set to an initial value and it is determined whether an RTS/CTS exchange scheme has been performed for the data. If the RTS/CTS exchange scheme has not been performed for the data, it is detected whether a collision has occurred to the data. If a collision is not detected, a failure number is increased and it is determined whether an RTS/CTS exchange triggering condition is fulfilled. If the RTS/CTS exchange triggering condition is fulfilled, an RTS frame is sent to a receiving WLAN apparatus to which data was transmitted. Reception of a CTS frame is monitored and the RTS frame is retransmitted until receiving the CTS frame. The failure number is compared with a failure threshold. If the failure number is greater than or equal to the failure threshold, a transmission rate of the WLAN apparatus is decreased by one level and the data is retransmitted at the decreased transmission rate.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a WLAN apparatus and method for controlling transmission rate, taking into account collision, in which the cause of a data transmission failure is identified as a channel error or a data collision to thereby reduce a collision-caused rate decrease or a rate increase delay. In the following description, "failure number" refers to the number of data transmission failures and "success number" refers to the number of successful data transmissions.

Figure 1:
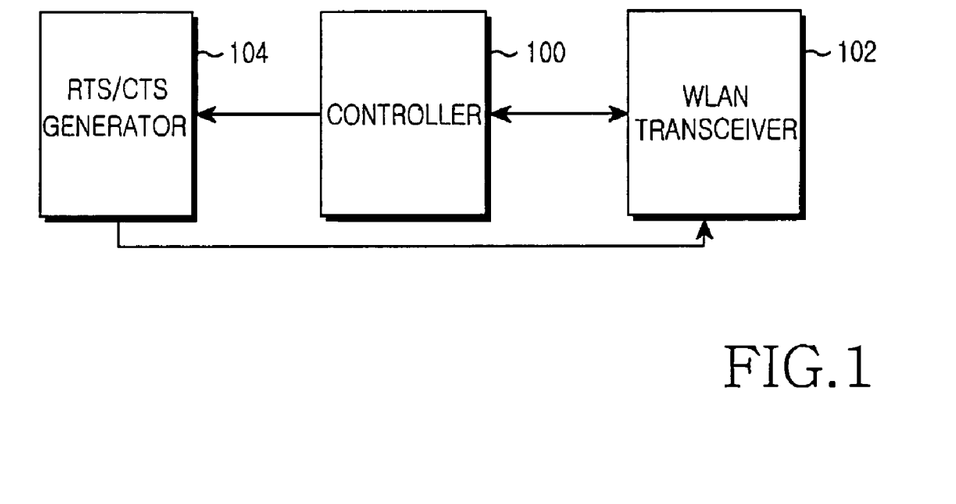
FIG. 1 is a block diagram of a WLAN apparatus for controlling transmission rate taking into account collision according to the present invention.

FIG. 1 is a block diagram of a WLAN apparatus for controlling transmission rate taking into account collision according to the present invention. Referring to FIG. 1, the WLAN apparatus includes a controller 100, a WLAN transceiver 102, and an RTS/CTS generator 104.

The controller 100 sets a success number to an initial value and increases a failure number when a data transmission failure occurs. When an RTS/CTS exchange triggering condition is fulfilled, the controller 100 triggers an RTS/CTS exchange. If the number of consecutive data transmission failures reaches a threshold, the controller 100 controls data retransmission by decreasing the transmission rate of the WLAN apparatus by one level. The rate control operation of the controller 100 will be described in more detail later with reference to FIG. 4.

The WLAN transceiver 102 sends/receives data and RTS and CTS frames under the control of the controller 100. The RTS/CTS generator 104 generates the RTS and CTS frames under the control of the controller 100 in compliance with the IEEE 802.11 WLAN standards.

Figure 2:
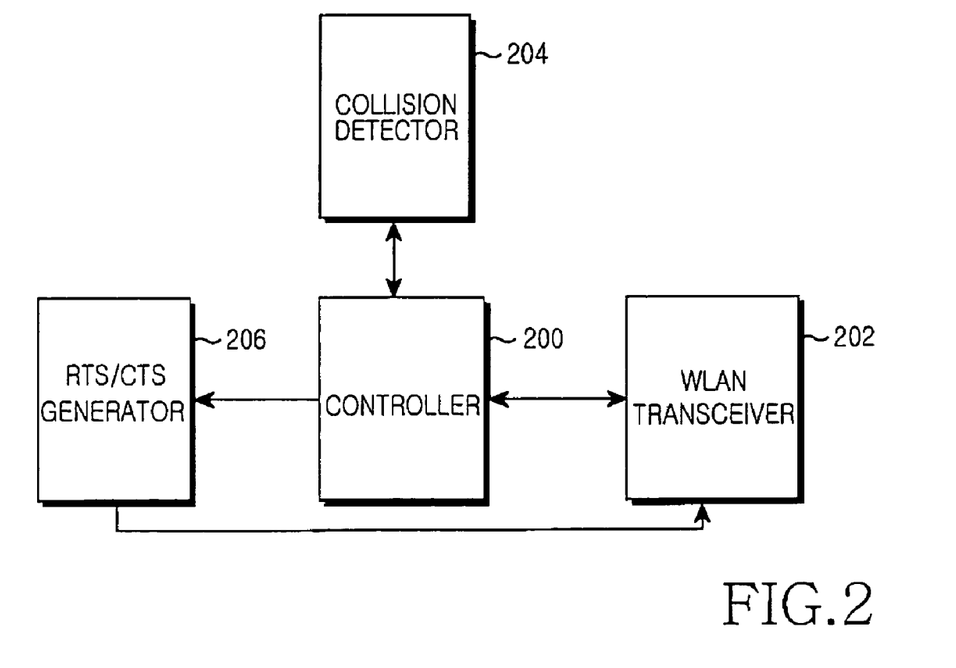
FIG. 2 is a block diagram of a WLAN apparatus for controlling transmission rate taking into account collision according to the present invention.

FIG. 2 is a block diagram of a WLAN apparatus for controlling transmission rate taking into account collision according to another embodiment of the present invention. The WLAN apparatus further includes a collision detector 204 in addition to the configuration of the WLAN apparatus illustrated in FIG. 1, for detecting a collision before RTS/CTS exchange, so that when collisions are not detected, the RTS/CTS exchange mechanism is triggered.

Referring to FIG. 2, the WLAN apparatus includes a controller 200, a WLAN transceiver 202, the collision detector 204, and an RTS/CTS generator 206. The controller 200 sets a success number to an initial value when a data transmission failure occurs. The controller 200 detects a collision through the collision detector 204. If a collision is detected, the controller 200 controls data to be retransmitted. If collisions are not detected, the controller 200 increases a failure number. When an RTS/CTS exchange triggering condition is fulfilled, the controller 200 triggers an RTS/CTS exchange. If the number of consecutive data transmission failures reaches a threshold, the controller 200 controls data retransmission by decreasing the transmission rate of the WLAN apparatus by one level. The rate control operation of the controller 200 will be described in more detail later with reference to FIG. 5.

It will be recognized that in another embodiment of the present invention the controller 200 determines that the occurrence time of a data transmission failure is after a collision detection failure. The rate control operation of the controller 200 in this embodiment is will be described later with reference to FIG. 6.

The WLAN transceiver 202 sends/receives data and RTS and CTS frames under the control of the controller 100. The collision detector 204, when a data transmission has failed, determines whether a data collision has occurred before the RTS/CTS exchange mechanism is triggered under the control of the controller 200. Notably, the collision detector 204 can always detect data collisions. How the collision detector 204 detects collisions and the cases of detectable collisions will be described with reference to FIG. 3.

The RTS/CTS generator 206 generates the RTS and CTS frames under the control of the controller 100 in compliance with the IEEE 802.11 WLAN standards.

Figure 3:
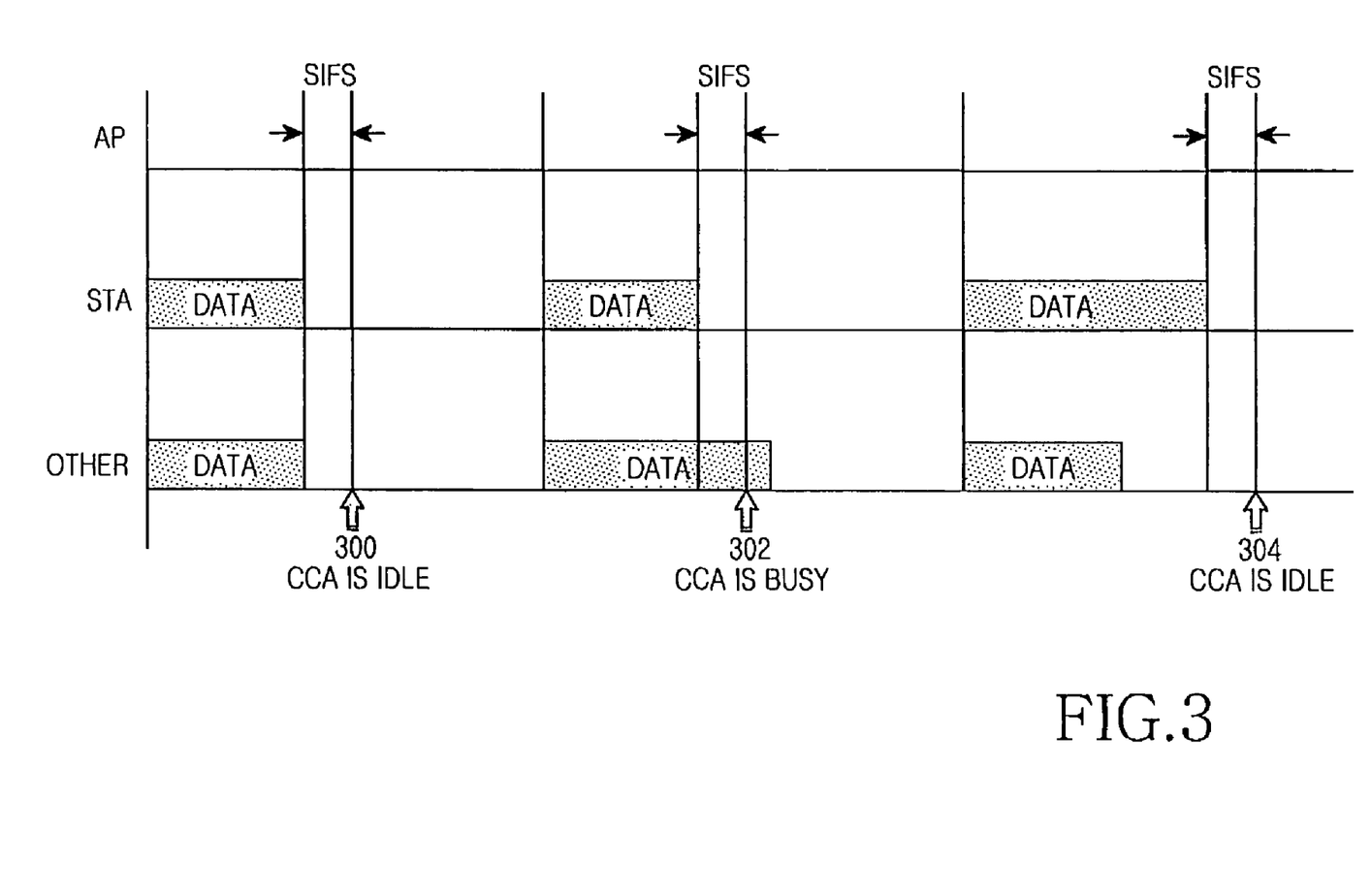
FIG. 3 illustrates data frame collision types and detectability of collisions in a WLAN.

FIG. 3 illustrates data frame collision types and detectability of collisions in the WLAN. Referring to FIG. 3, the collision detector 204 detects data collisions in a method compliant with the IEEE 802.11 WLAN standard. The WLAN apparatus determines whether a collision has occurred by monitoring a channel a predetermined time, i.e., an SIFS after data transmission.

Referring to FIG. 3, "STA" is a WLAN apparatus attempting to send data at present and "other" refers to all WLAN apparatuses capable of sending data, expect the STA. Reference numeral 300 denotes collision between data frames of the same duration and reference numerals 302 and 304 denote collisions between data frames of different durations.

The collision detector 204 can detect only the collision 302 which occurs when a data frame from the STA is shorter in transmission duration than a data frame from another WLAN apparatus by the SIFS or longer. In the other cases, the collision detector 204 cannot find collisions.

As more data frame sizes are used in the WLAN and as more data rates are used in the WLAN apparatuses, the collision 300 occurs with a very low probability. On the other hand, the collisions 302 and 304 occurs with the same probability. Under the environment with various data frame sizes and data rates, the collisions 302 and 304 may occur simultaneously to different STAs and thus their detection probability is approximately 50%.

How the above-described WLAN apparatuses control transmission rate, taking into account collision, will be described with references to FIGS. 4, 5 and 6.

Figure 4:
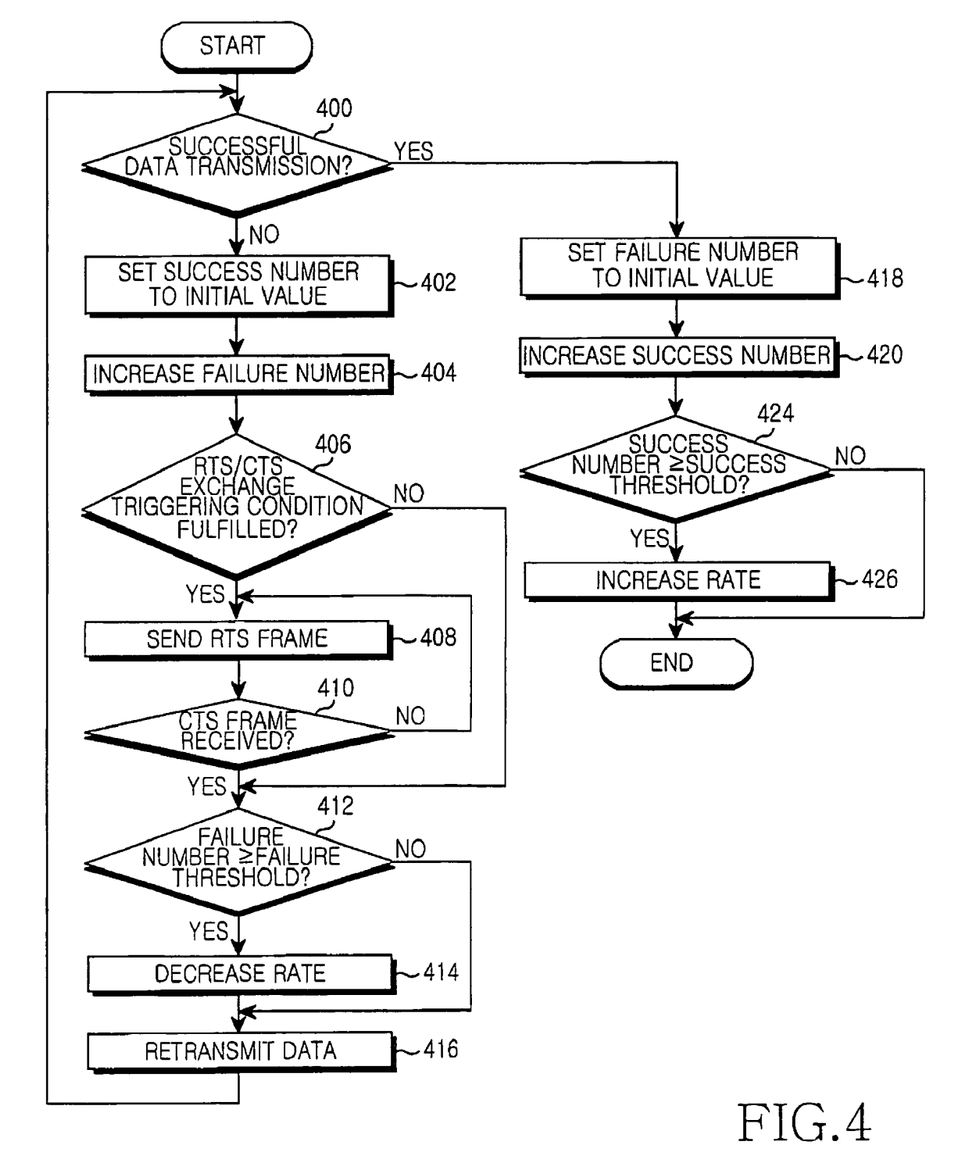
FIG. 4 is a flowchart illustrating a transmission rate control operation in the WLAN apparatus according to the present invention.

FIG. 4 is a flowchart illustrating a transmission rate control operation in the WLAN apparatus illustrated in FIG. 1 according to the present invention.

Referring to FIG. 4, the WLAN apparatus determines whether data transmission is successful in step 400. In the case of a data transmission failure, the WLAN apparatus sets the success number to an initial value in step 402, increases the failure number in step 404, and determines whether a RTS/CTS exchange triggering condition is fulfilled in step 406.

The RTS/CTS exchange triggering condition is when the size of a MAC Protocol Data Unit (MPDU) to be sent is greater than or equal to a predetermined RTS transmission threshold, or the number of data transmission failures is equal to or larger than a predetermined RTS start value. If the data frame size is equal to or larger than the RTS transmission threshold, the failure of the data frame leads to greater consumption of resources. With the RTS start value, the start time of triggering the RTS/CTS exchange mechanism is decided. In the case of a predetermined number of data transmission failures, they may be caused by collision and thus channel resources are reserved by means of the RTS/CTS exchange. The RTS/CTS start value defines the start of the data transmission with the reserved channel resources.

If the RTS/CTS exchange triggering condition is not fulfilled in step 406, the WLAN apparatus goes to step 412. If the RTS/CTS exchange triggering condition is fulfilled in step 406, the WLAN apparatus sends an RTS frame to a receiving WLAN apparatus in step 408 and monitors reception of a CTS frame in step 410. If the WLAN apparatus fails to receive the CTS frame in step 410, it returns to step 408.

Upon receipt of the CTS frame in step 410, the WLAN apparatus compares the failure number with a predetermined failure threshold in step 412. If the failure number is less than the failure threshold, the WLAN apparatus retransmits the data in step 416 and returns to step 400.

If the failure number is greater than or equal to the threshold in step 412, which implies that the number of failed data transmissions equals or exceeds the failure threshold, the WLAN apparatus decreases its transmission rate by one level in step 414, retransmits the data at the decreased rate in step 416, and returns to step 400.

If the data transmission is successful in step 400, the WLAN apparatus sets the failure number to an initial value in step 418, increases the success number in step 420, and compares the success number with a predetermined success threshold in step 424.

If the success number is greater than or equal to the success threshold, which implies that the number of successful data transmissions equals or exceeds the success threshold, the WLAN apparatus increases the transmission rate by one level in step 426 and ends the algorithm.

If the success number is less than the success threshold in step 424, the algorithm is ended.

Figure 5:
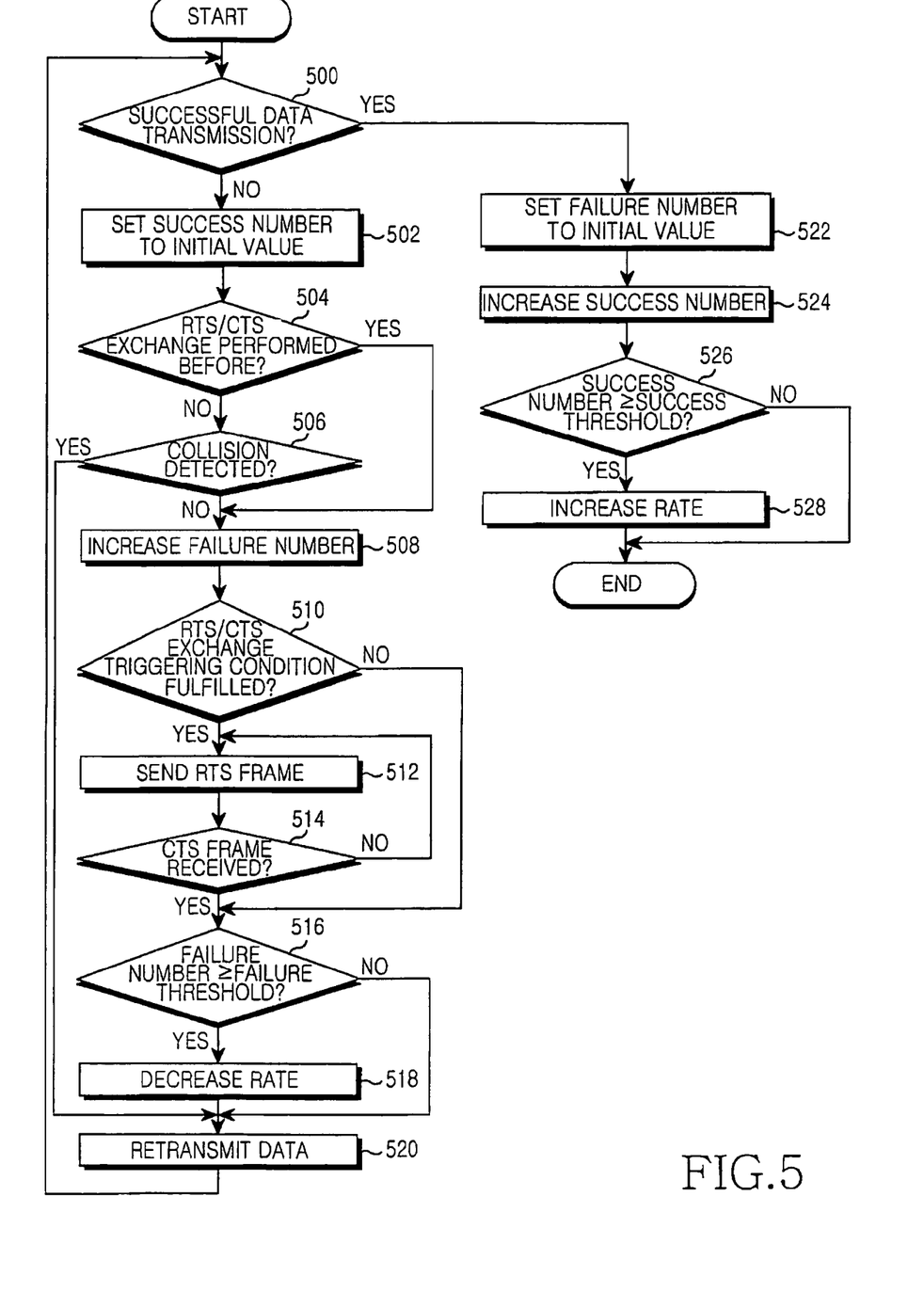
FIG. 5 is a flowchart illustrating a transmission rate control operation in the WLAN apparatus according to another embodiment of the present invention.

FIG. 5 is a flowchart illustrating a transmission rate control operation in the WLAN apparatus illustrated in FIG. 2 according to another embodiment of the present invention. This transmission rate control operation controls transmission rate according to collision detection, the triggering time of the RTS/CTS exchange mechanism, and the number of successive transmission failures, with no regard to collision-caused rate increase delay. It is almost the same as the transmission rate control operation described in FIG. 4, except that a data collision detection procedure is further performed between steps 402 and 404 of FIG. 4.

Referring to FIG. 5, the WLAN apparatus determines whether data transmission is successful in step 500. In the case of a data transmission failure, the WLAN apparatus sets the success number to an initial value in step 502 and determines whether the RTS/CTS exchange scheme has been performed previously for the failed data frame in step 504.

The reason for performing step 504 is that if the RTS/CTS exchange scheme was implemented before, this means that collision detection was carried out at least once and another collision detection is useless because other competing WLAN apparatuses are sending short RTS frames after the RTS/CTS exchange.

If the RTS/CTS exchange was performed before, the WLAN apparatus skips a collision detection step 506, jumping to step 508. If the RTS/CTS exchange has not been performed, the WLAN apparatus performs collision detection in step 506.

If a collision is detected in step 506, the WLAN apparatus retransmits the data in step 520 and returns to step 500. If collisions are not detected in step 506, the WLAN apparatus increases the failure number in step 508, and determines whether the same RTS/CTS exchange triggering condition, as described in step 406 of FIG. 4, is fulfilled in step 510.

If the RTS/CTS exchange triggering condition is not fulfilled in step 510, the WLAN apparatus goes to step 516.

If the RTS/CTS exchange triggering condition is fulfilled in step 510, the WLAN apparatus sends an RTS frame to a receiving WLAN apparatus in step 512 and monitors reception of a CTS frame in step 514. If the WLAN apparatus fails to receive the CTS frame in step 514, it returns to step 512.

Upon receipt of the CTS frame in step 514, the WLAN apparatus compares the failure number with a predetermined failure threshold in step 516. If the failure number is less than the failure threshold, the WLAN apparatus retransmits the data in step 520 and returns to step 500.

If the failure number is greater than or equal to the threshold in step 516, which implies that the number of failed data transmissions equals or exceeds the failure threshold, the WLAN apparatus decreases its transmission rate by one level in step 518, retransmits the data at the decreased rate in step 520, and returns to step 500.

If the data transmission is successful in step 500, the WLAN apparatus sets the failure number to an initial value in step 522, increases the success number in step 524, and compares the success number with a predetermined success threshold in step 526.

If the success number is greater than or equal to the success threshold in step 526, which implies that the number of successful data transmissions is equal to or exceeds the success threshold, the WLAN apparatus increases the transmission rate by one level in step 528 and ends the algorithm.

If the success number is less than the success threshold in step 526, the algorithm is ended.

Figure 6:
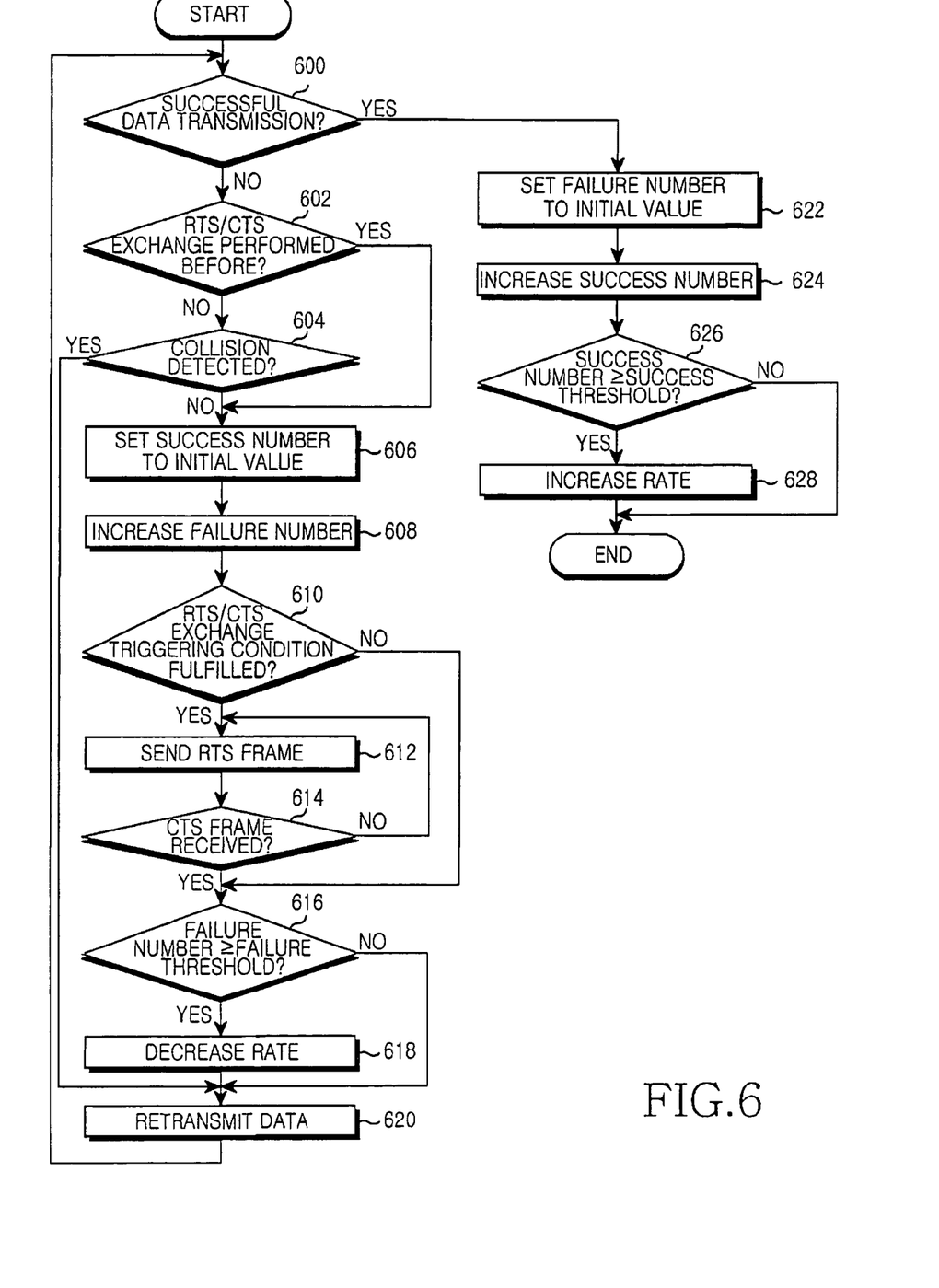
FIG. 6 is a flowchart illustrating a transmission rate control operation in the WLAN apparatus according to another embodiment of the present invention.

FIG. 6 is a flowchart illustrating a transmission rate control operation in the WLAN apparatus illustrated in FIG. 2 according to another embodiment of the present invention. This transmission rate control operation controls transmission rate, taking into account collision-caused rate increase delay, collision detection, the triggering time of the RTS/CTS exchange mechanism, and the number of successive transmission failures. It is almost the same as the transmission rate control operation described in FIG. 4, except that a data collision detection procedure is further performed between steps 400 and 402 of FIG. 4.

Referring to FIG. 6, the WLAN apparatus determines whether data transmission is successful in step 600. In the case of a data transmission failure, the WLAN determines whether the RTS/CTS exchange scheme has been performed previously for the failed data frame for the same reason described before regarding step 504 of FIG. 5, in step 602.

If the RTS/CTS exchange was performed before, the WLAN apparatus skips a collision detection step 604, jumping to step 606. If the RTS/CTS exchange has not been performed, the WLAN apparatus performs collision detection in step 604.

If a collision is detected in step 604, the WLAN apparatus retransmits the data in step 620 and returns to step 600.

If collisions are not detected in step 604, the WLAN apparatus sets the success number to an initial value in step 606, increases the failure number in step 608, and determines whether the same RTS/CTS exchange triggering condition as that in step 406 of FIG. 4 is fulfilled in step 610.

If the RTS/CTS exchange triggering condition is not fulfilled in step 610, the WLAN apparatus goes to step 616. If the RTS/CTS exchange triggering condition is fulfilled in step 610, the WLAN apparatus sends an RTS frame to a receiving WLAN apparatus in step 612 and monitors reception of a CTS frame in step 614. If the WLAN apparatus fails to receive the CTS frame in step 614, it returns to step 612.

Upon receipt of the CTS frame in step 614, the WLAN apparatus compares the failure number with a predetermined failure threshold in step 616. If the failure number is less than the failure threshold, the WLAN apparatus retransmits the data in step 620 and returns to step 600.

If the failure number is greater than or equal to the threshold in step 616, which implies that the number of failed data transmissions equals or exceeds the failure threshold, the WLAN apparatus decreases its transmission rate by one level in step 618, retransmits the data at the decreased rate in step 620, and returns to step 600.

If the data transmission is successful in step 600, the WLAN apparatus sets the failure number to an initial value in step 622, increases the success number in step 624, and compares the success number with a predetermined success threshold in step 626.

If the success number is greater than or equal to the success threshold in step 626, which implies that the number of successful data transmissions is equal to or exceeds the success threshold, the WLAN apparatus increases the transmission rate by one level in step 628 and ends the algorithm.

If the success number is less than the success threshold in step 626, the algorithm is ended.

A comparison between FIG. 5 and FIG. 6 shows that the step of setting the success number to an initial value is performed at different points of time. In the procedure of FIG. 5, the success number is set to an initial value immediately after the data transmission failure. This implies that a collision-caused rate increase delay is not considered. On the other hand, the success number is set to an initial value when the collision detection fails in the procedure illustrated in FIG. 6. That is, since a data collision is not a channel error-caused transmission failure, the success number is not initialized when a collision is detected.

In accordance with the present invention as described above, since the cause of a data transmission failure is identified as a channel error or a data collision, a collision-caused rate decrease or a collision-caused rate increase delay is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Wireless Local Access Network (WLAN) apparatus for controlling transmission rate, taking into account collision, comprising:
   a WLAN transceiver for sending and receiving data and Request-To-Send (RTS) and Clear-To-Send (CTS) frames under the control of a controller;
   an RTS/CTS generator for generating the RTS and CTS frames under the control of the controller; and
   the controller for, when a data transmission fails, increasing a failure number, determining whether an RTS/CTS exchange triggering condition is fulfilled,
performing an RTS/CTS exchange scheme if the RTS/CTS exchange triggering condition is fulfilled,
comparing the failure number with a failure threshold, if the RTS/CTS exchange triggering condition is not fulfilled or when the CTS frame is received,
when the failure number is greater than or equal to the failure threshold, decreasing a transmission rate of the WLAN apparatus,
and retransmitting data at the decreased transmission rate.

2. A Wireless Local Access Network (WLAN) apparatus for controlling transmission rate, taking into account collision, comprising:
a WLAN transceiver for sending and receiving data and Request-To-Send (RTS) and Clear-To-Send (CTS) frames under the control of a controller;
an RTS/CTS generator for generating the RTS and CTS frames under the control of the controller;
a collision detector for detecting whether a collision has occurred when a data transmission fails; and
the controller for, when the data transmission fails,
determining whether an RTS/CTS exchange scheme has been performed before,
performing collision detection through the collision detector if the RTS/CTS exchange scheme was not perforated before, and
if no collision is detected,
increasing a failure number,
determining whether an RTS/CTS exchange triggering condition is fulfilled,
performing an RTS/CTS exchange scheme if the RTS/CTS exchange triggering condition is fulfilled,
comparing the failure number with a failure threshold,
when the failure number is greater than or equal to the failure threshold, decreasing a transmission rate of the WLAN apparatus, and
retransmitting data at the decreased transmission rate.

3. The WLAN apparatus of claim 2, wherein if the RTS/CTS exchange scheme has been performed before, the controller
does not perform the collision detection,
increases the failure number,
determines whether the RTS/CTS exchange triggering condition is fulfilled,
performs the RTS/CTS exchange scheme, if the RTS/CTS exchange triggering condition is fulfilled,
compares the failure number with the failure threshold,
if the failure number is greater than or equal to the failure threshold, decreases the transmission rate of the WLAN apparatus, and
retransmits the data at the decreased transmission rate.

4. The WLAN apparatus of claim 2, wherein if collision is detected, the controller retransmits the data.

5. The WLAN apparatus of claim 2, wherein when the data transmission fails, the controller sets a success number to an initial value.

6. The WLAN apparatus of claim 1, wherein the RTS/CTS exchange triggering condition comprises one of:
a size of a transmission data frame being greater than or equal to a predetermined RTS transmission threshold; and
the failure number being greater than or equal to a predetermined RTS start value.

7. The WLAN apparatus of claim 1, wherein the controller does not perform the RTS/CTS exchange scheme, lithe RTS/CTS exchange triggering condition is not fulfilled.

8. The WLAN apparatus of claim 1, wherein, if the failure number is less than the failure threshold, the controller retransmits the data without decreasing the transmission rate.

9. The WLAN apparatus of claim 1, wherein if the data transmission is successful, the controller sets the failure number to an initial value, increases a success number, compares the increased success number with a predetermined success threshold, and if the increased success number is greater than or equal to the success threshold, increases the transmission rate.

10. A method of controlling transmission rate, taking into account collision in a Wireless Local Access Network (WLAN) apparatus, comprising the steps of:
determining whether a data transmission has succeeded or failed; and
when the data transmission has failed:
increasing a failure number;
determining whether a Request-To-Send (RTS)/Clear-To-Send (CTS) exchange triggering condition is fulfilled;
sending an RTS frame to a receiving WLAN apparatus to which the data was transmitted, if the RTS/CTS exchange triggering condition is fulfilled;
monitoring reception of a CTS frame and retransmitting the RTS frame until receiving the CTS frame in response to the RTS frame;
comparing the failure number with a failure threshold, if the RTS/CTA exchange triggering condition is not fulfilled or when the CTS frame is received;
decreasing a transmission rate of the WLAN apparatus, when the failure number is greater than or equal to the failure threshold; and
retransmitting the clam at the decreased transmission rate.

11. A method of controlling transmission rate, taking into account collision in a Wireless Local Access Network (WLAN) apparatus, comprising the steps of:
determining whether transmission of data is successful or has failed; and
when the data transmission has failed:
determining whether a Request-To-Send (RTS)/Clear-To-Send (CTS) exchange scheme has been performed for the data;
detecting whether a collision has occurred to the data if the RTS/CTS exchange scheme has not been performed for the data;
increasing a failure number, if collision is not detected or if the RTS/CTS exchange scheme has been performed for the data;
determining whether an RTS/CTS exchange triggering condition is fulfilled;
sending an RTS frame to a receiving WLAN apparatus to which data was transmitted, if the RTS/CTS exchange triggering condition is fulfilled;
monitoring reception of a CTS frame and retransmitting the RTS frame until receiving the CTS frame in response to the RTS frame, if the RTS/CTS exchange triggering condition is fulfilled;
comparing the failure number with a failure threshold, if the RTS/CTS exchange triggering condition is not fulfilled or when the CTS frame is received;
decreasing a transmission rate of the WLAN apparatus, when the failure number is greater than or equal to the failure threshold; and
retransmitting the data at the decreased transmission rate.

12. The method of claim 11, further comprising the step of, if the RTS/CTS exchange scheme has been performed, increasing the failure number without the collision detection.

13. The method of claim 11, further comprising, if a collision is detected, retransmitting the data.

14. The method of claim 11, further comprising the step of setting a success number to an initial value, when the data transmission has failed.

15. The method of claim 10, wherein the RTS/CTS exchange triggering conditions includes one of a size of a transmission data frame being greater than or equal to a predetermined RTS transmission threshold, and the failure number being greater than or equal to a predetermined RTS start value.

16. The method of claim 10, further comprising, if the failure number is less than the failure threshold, retransmitting the data without decreasing the transmission rate.

17. The method of claim 10, if the data transmission is successful, further comprising:
setting the failure number to an initial value;
increasing a success number;
comparing the increased success number with a predetermined success threshold; and
increasing the transmission rate, if the increased success number is greater than or equal to the success threshold.

18. The WLAN apparatus of claim 2, wherein the RTS/CTS exchange triggering condition comprises one of:
a size of a transmission data frame being greater than or equal to a predetermined RTS transmission threshold; and
the failure number being greater than or equal to a predetermined RTS start value.

19. The WLAN apparatus of claim 2, wherein the controller does not perform the RTS/CTS exchange scheme, if the RTS/CTS exchange triggering condition is not fulfilled.

20. The WLAN apparatus of claim 2, wherein if the failure number is less than the failure threshold, the controller retransmits the data without decreasing the transmission rate.

21. The WLAN apparatus of claim 2, wherein if the data transmission is successful, the controller sets the failure number to an initial value, increases a success number, compares the increased success number with a predetermined success threshold, and if the increased success number is greater than or equal to the success threshold, increases the transmission rate.

22. A method of controlling transmission rate in a Wireless Local Access Network (WLAN) apparatus, comprising the steps of:
determining whether a Request-To-Send (RTS)/Clear-To-Send (CTS) exchange triggering condition is fulfilled;
sending an RTS frame to a receiving WLAN apparatus to which data was transmitted, if the RTS/CTS exchange triggering condition is fulfilled;
monitoring reception of a CTS frame and retransmitting the RTS frame until receiving the CTS frame in response to the RTS frame;
comparing a failure number with a failure threshold, if the RTS/CTS exchange triggering condition is not fulfilled or when the CTS frame is received; and
decreasing a transmission rate of the WLAN apparatus, when the failure number is greater than or equal to the failure threshold.

23. A method of controlling transmission rate in a Wireless Local Access Network (WLAN) apparatus, comprising the steps of:
detecting whether a collision has occurred to the data if the RTS/CTS exchange scheme has not been performed for the data; and
when a collision is not detected:
increasing a failure number;
determining whether an RTS/CTS exchange triggering condition is fulfilled;
sending an RTS frame to a receiving WLAN apparatus to which data was transmitted, if the RTS/CTS exchange triggering condition is fulfilled;
monitoring reception of a CTS frame and retransmitting the RTS frame until receiving the CTS frame in response to the RTS frame;
comparing the failure number with a failure threshold; and
decreasing a transmission rate of the WLAN apparatus by one level, when the failure number is greater than or equal to the failure threshold.

* * * * *